United States Patent
Wilson

[11] Patent Number: 6,088,603
[45] Date of Patent: *Jul. 11, 2000

[54] SHIELDING DEVICE

[76] Inventor: Leslie Ronald Wilson, 29, The Spinney, Winchmore Hill, London N21 1LC, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/661,481

[22] Filed: Jun. 11, 1996

[30] Foreign Application Priority Data

Oct. 27, 1995 [GB] United Kingdom ............. 9522050

[51] Int. Cl.[7] ....................................... H04B 1/38
[52] U.S. Cl. ..................... 455/575; 455/90; 455/117; 455/129; 343/702; 343/841
[58] Field of Search ................. 455/89, 90, 128, 455/129, 97, 117, 33.1, 422, 550, 575; 379/59; 343/890, 891, 841, 873, 718, 702

[56] References Cited

U.S. PATENT DOCUMENTS

| | | | |
|---|---|---|---|
| 5,335,366 | 8/1994 | Daniels | 455/129 |
| 5,338,896 | 8/1994 | Danforth | 455/90 |
| 5,367,309 | 11/1994 | Tashjian | 455/90 |
| 5,392,461 | 2/1995 | Yokoyama | 455/129 |
| 5,444,866 | 8/1995 | Cykiert | 455/89 |
| 5,493,702 | 2/1996 | Crowley et al. | 455/90 |
| 5,493,704 | 2/1996 | Grangeat et al. | 455/90 |
| 5,507,012 | 4/1996 | Luxon et al. | 455/90 |
| 5,530,919 | 6/1996 | Tsuru et al. | 455/129 |
| 5,535,439 | 7/1996 | Katz | 455/129 |
| 5,550,552 | 8/1996 | Oxley | 455/89 |
| 5,694,137 | 12/1997 | Wood | 343/702 |

*Primary Examiner*—Doris H. To
*Attorney, Agent, or Firm*—Armstrong, Westerman, Hattori, McLeland & Naughton

[57] ABSTRACT

A shielding device for use with a communications device, the shielding device comprising an electrically conductive element, a support for slidably supporting the conductive element, a mount to mount the support in position relative to the communication device and a slider to slide the electrically conductive element from a retracted position to an extended position, the electrically conductive element, when in the extended position, having a predetermined position relative to the antenna of the communication device.

9 Claims, 2 Drawing Sheets

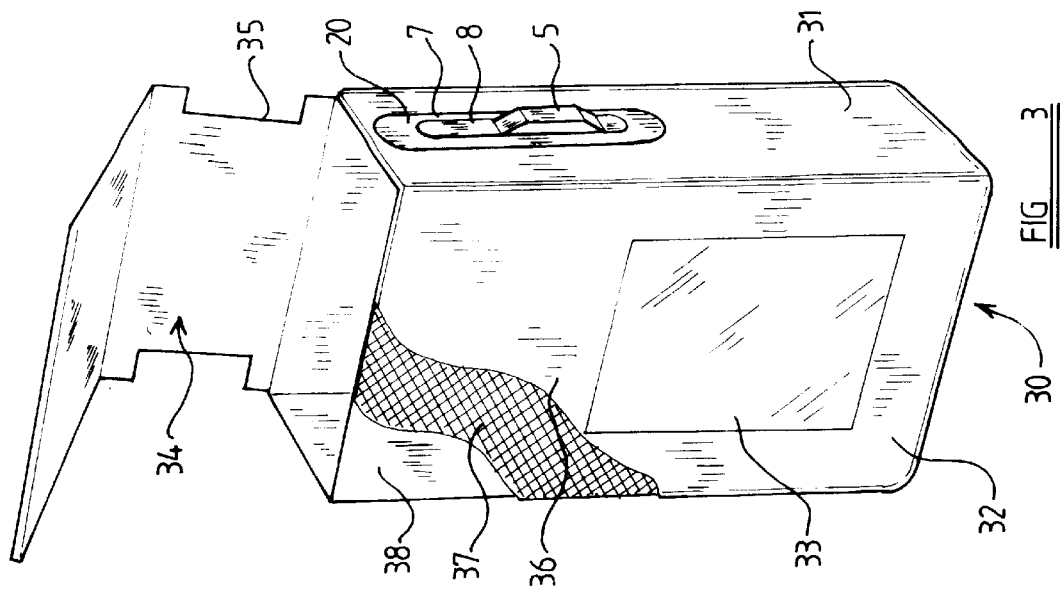
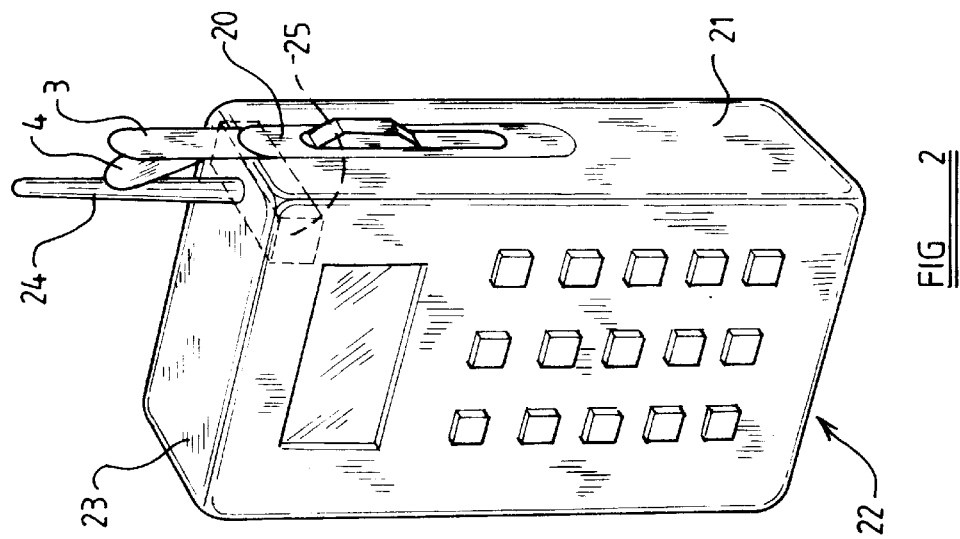
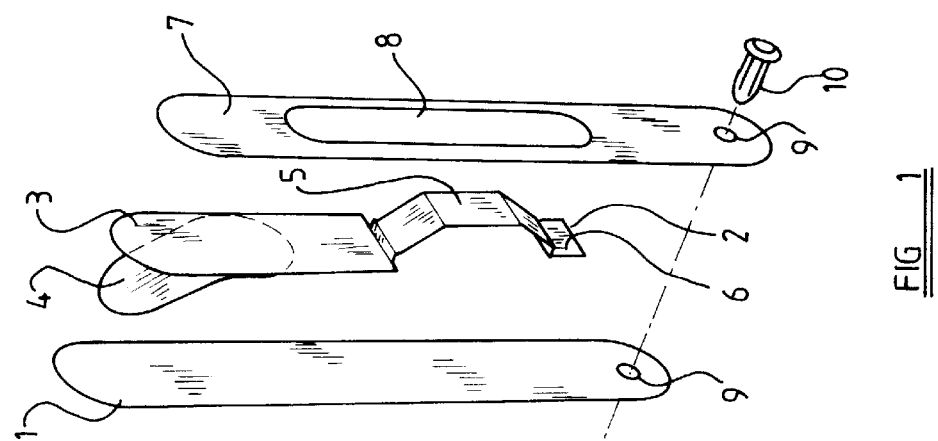

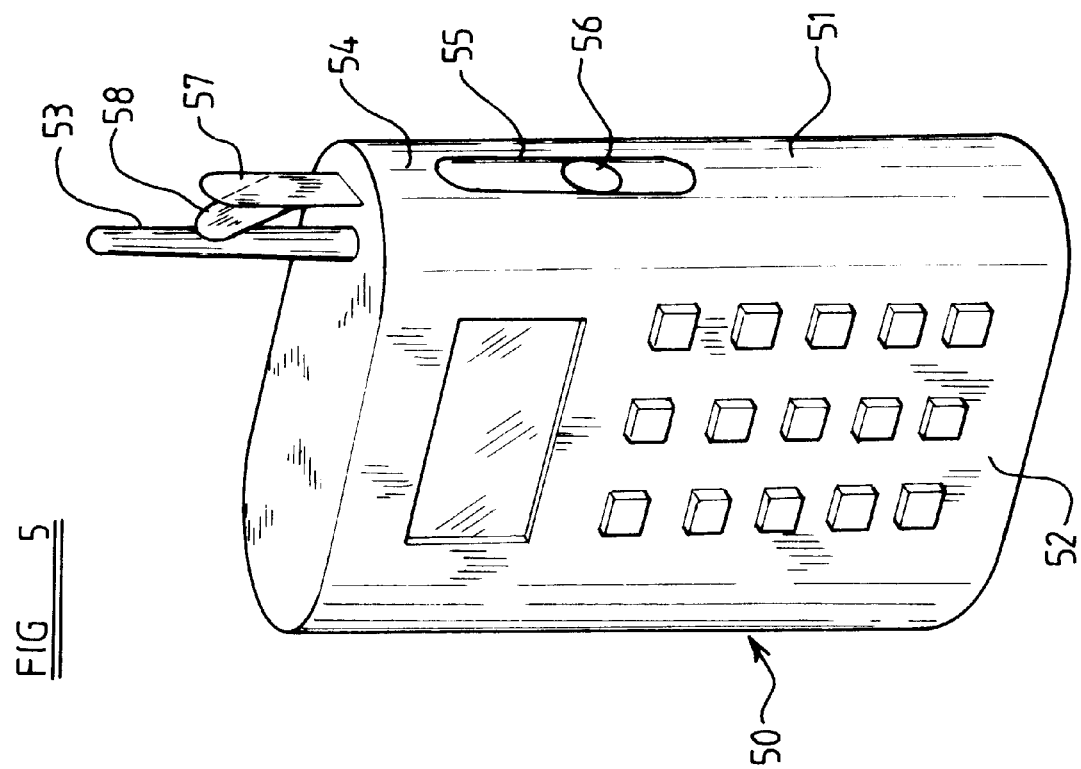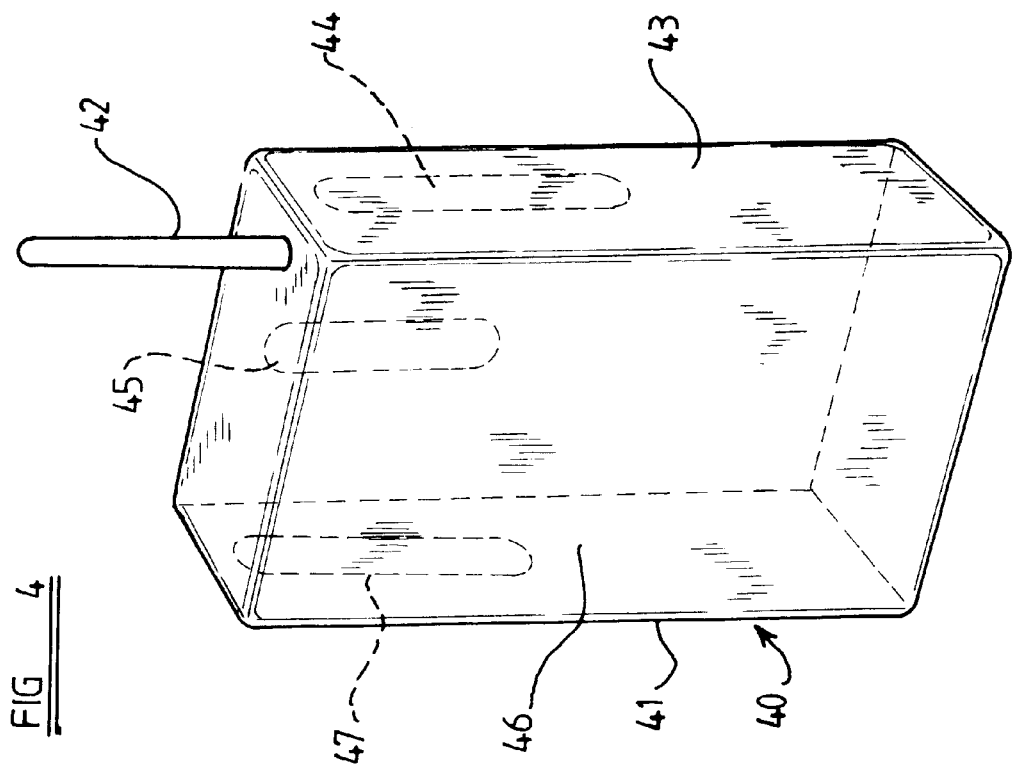

SHIELDING DEVICE

BACKGROUND OF THE INVENTION

THE PRESENT INVENTION relates to a shielding device and more particularly, relates to a shielding device for use with a portable communication unit such as a paging unit and especially a cellular or radio telephone.

In recent years there has been a substantial increase in the number of communication units in the form of paging units and cellular or radio telephones that are in use. Paging units comprise totally passive devices which simply act to receive signals transmitted from a central transmitter and subsequently to provide a visual or audible indication that such a signal has been received, or active paging devices which can be used not only to receive signals from a central transmitter, but also to transmit signals to the central transmitter to provide, for example, an indication of the approximately area in which the paging device is located, or to provide more specific items of data. Such paging devices are "active" devices in that they actually transmit a signal.

Cellular telephones are also "active" devices in that whenever a cellular telephone is switched on, at regular predetermined intervals, it transmits a brief signal, intended to be received by the closest cell transmitter/receiver, so that the central computers operating the cellular telephone system may be aware of the identity of the cell in which each telephone that is currently switched on is actually located. Of course, when a mobile telephone is actually being used to make a call, it is also transmitting signals.

There is reason to believe that the human body may be damaged on exposure to high intensity radio frequency radiation. It is radiation of this type that is given off by an active paging device and by a cellular telephone. A particular difficulty may be found to exist with cellular telephones which, when in use, are held very close to the head. Signals transmitted by the cellular telephone must be of a sufficient intensity to be received by the transmitter/receiver of the cell. Consequently, there is a substantial risk that the degree of radiation applied to the head of a person using the cellular telephone may be such that, at least in the long term, damage to the brain may be caused.

It has been proposed to provide a shielding device for use with an active pager and for use with a mobile telephone, but prior proposed shielding devices suffer from various disadvantages and drawbacks.

One disadvantage is that when the shielding device is operational, the shielding effect that is provided may be so great that the communication unit may not be able to receive signals transmitted to it by the appropriate transmitter/receiver.

SUMMARY OF THE INVENTION

According to one aspect of this invention there is provided a shielding device for use with a communications device, the shielding device comprising an electrically conductive element, supporting means slidably supporting the conductive element, means to mount the supporting means in position relative to the communication device and means to slide the electrically conductive element from a retracted position to an extended position, the electrically conductive element, when in the extended position, having a predetermined position relative to the antenna of the communication device.

According to another aspect of this invention there is provided a shield for shielding radiation from a communication device, having an antenna, the shield comprising an electrically conductive portion adapted to be located at a position spaced from the antenna, the electrically conductive portion being adapted to touch the antenna of the communication device, or, alternatively, carrying a resilient finger, the resilient finger being adapted to touch the antenna of the communication device.

According to a further aspect of this invention there is provided a shield for shielding radiation from a communication device, the shield comprising a base plate made of conductive material, a slider, and a cover, the slider being located between the base plate and the cover, part of the slider being accessible through the cover, to effect sliding of the slider, the slider being movable between a retracted position and an extended position, the slider, when in the extended position, having an electrically conductive portion extending beyond the base plate and the cover.

According to yet another aspect of this invention there is provided a case for a communication device, the case being provided with a retractable shield, the shield being movable to an extended position, the shield being located to one side of the antenna of the communication device so that, in use, the shield is not between the antenna of the communication device and a person using the communication device.

According to yet a further aspect of this invention there is provided a case for a communication device, the case being provided with a shield movable between an operative position and an extended position, the shield being in electrical contact with a further shielding element within the case.

Preferably the further shielding comprises an electrically conductive layer in a laminate forming at least part of the casing.

According to even another embodiment of the invention there is provided a communication device having an antenna and shielding element movable from a retracted position to an extended position, the shielding element having an electrically conductive portion which, when the shielding element is in the extended position, touches the antenna.

According to yet another embodiment of the invention there is provided a mobile telephone having an antenna and a shield located to one side of or behind the antenna so that the shield is not located between the antenna and the head of a person using the telephone.

DESCRIPTION OF THE DRAWINGS

In order that the invention may be more readily understood, and so that further features thereof may be appreciated, the invention will now be described, by way of example, with reference to the accompanying drawings in which:

FIG. 1 is an exploded view of the components that form one example of a shield for use in the present invention, FIG. 2 is a view illustrating the shield of FIG. 1 when mounted on a mobile telephone, only part of the telephone being illustrated, a component of the telephone being illustrated in phantom, FIG. 3 is a view illustrating the shield of FIG. 1 when mounted on a case which is adapted to accommodate a telephone, parts of the case being shown cut away, FIG. 4 is a rear view of a mobile telephone illustrating regions where a shield in accordance with the invention may be located, FIG. 5 is a view of part of a mobile telephone illustrating a shield in accordance with the invention that is formed integrally with the mobile telephone.

DESCRIPTION OF THE PREFERRED EMBODIMENTS

Referring now to the drawings, FIG. 1 illustrates the component parts of one example of a shield in accordance with the invention. The component parts comprise a base plate 1 of elongate oval form, which is formed of an electrically conductive metal. A slider element 2 is provided which slides relative to the base plate 1. The slider assembly 2 comprises an upper portion 3 made of an electrically conductive material, such as a metal. The conductive portion 3 carries, at the upper end of its face adjacent the base plate 1, a resilient deflected finger 4. The resilient deflected finger 4 is also preferably made of an electrically conductive material, such as a metal.

Below the conductive portion 3 of the slider element 2, is an upwardly arched region 5. The upwardly arched region is thus spaced away from the base plate 1. The upwardly arched region 5 may be made of metal, but is preferably made of an electrically insulating material, such as a plastic or the like. The arched region terminates with a portion 6 which is co-planar with the conductive portion 3.

A cover plate 7 is provided, the cover plate 7 being formed of a metal or of a plastic, the cover plate 7 having an outer dimension substantially identical with the outer dimension of the base plate 1. An elongate oval aperture 8 is formed in the cover 7. The width of the aperture 8 is equivalent to the width of the arched portion 5 of the slider element 2.

The base plate 1 and the cover 7 are provided, at their lower ends, with co-aligned apertures 9. A rivet, such as the rivet 10 may pass through the co-aligned apertures 9 to secure the components, as illustrated in FIG. 1, together.

FIG. 2 illustrates a shield 20 comprising the components illustrated in FIG. 1, the shield being mounted on one side 21 of a mobile telephone 22. The shield is shown with the slider element 2 in its upper-most position. As can be seen from FIG. 2, the conducting portion 3 of the slider element 2 projects above the upper surface 23 of the telephone 22, thus extending immediately adjacent the aerial or antenna 24. The resilient electrically conductive finger 4 is resiliently biassed towards and actually touches the antenna 24.

It is to be appreciated that at the base of the antenna 24 is, within the housing of the telephone, the RF power block 25 (shown in phantom) which supplies the energy which is intended to be dissipated by the antenna 24. A substantial quantity of radiation is given off by both the power block 25 and the antenna 24.

It is to be observed that the shield 20 is located adjacent the power block 25. The base plate 1 of the shield 20 is made of electrically conducting material and provides a shielding effect for radiation given off by the power block. Since, in the position illustrated, the slider is in the upper-most position, part of the shield is located immediately to one side of the antenna 24. This provides a further shielding effect which is, it is believed, enhanced by the fact that the resilient conductive finger 4 is in contact with the antenna.

It is believed that the provision of the shield at the position illustrated will substantially reduce the damaging radiation that may impinge on the head of a person using the mobile telephone 22. This is surprising since the shield is located in a position which is not directly between the antenna 24 (and the power block 25) and the head of a person using the telephone 22.

Should the shielding effect provided by the shield be so great that the mobile telephone cannot adequately receive signals from the transmitter/receiver of the relevant cell, the slider 2 may be moved downwards slightly simply by gripping the arched portion 5 which extends through the aperture 8, and exerting a downward force. The slider would then slide downwardly. The conductive portion 3 would thus provide a lesser shielding effect for the aerial or antenna 24. This does increase the risk of damage being imparted to the head of the person using the mobile telephone, but does at least allow the telephone to receive signals.

It is to be appreciated, at this stage, that the shield 20 may be mounted on the exterior of the housing of the telephone in any appropriate way. It may be secured in position by adhesive, by double-sided tape, by rivetting or by any other appropriate technique.

FIG. 3 illustrates an alternative embodiment of the invention in which the shield 20 is secured to part of a casing 30 adapted to receive a mobile telephone. As can be seen in FIG. 3 the conductive portion 3 of the slider 20 is not visible, since the slider 20 is in the lower-most or fully retracted position. Consequently, the arched portion 5 is located at the lower end of the slot 8 provided in the cover 7.

Referring to FIG. 3, the shield 20 is illustrated secured to a casing 30, which is adapted to contain a cellular telephone. The casing has a sidewall 31, and a front wall 32. The front wall 32 has a transparent window 33, intended to be aligned with the key-pad of a mobile telephone to be received by the casing. The casing has a closure flap 34, with a cut-out or notch 35 at one side to receive the aerial or antenna of the mobile telephone.

The casing may be made of an appropriate laminate, the laminate comprising an outer insulating layer, such as the layer 36 which may be formed of an appropriate plastics material, an intermediate electrically conducting layer 37 and an inner insulating layer 38 which may be made, again, of an appropriate plastics material.

The conducting layer 37 may be formed of an apertured copper mesh, or a relatively loose weave copper scrim, and is intended to provide a shielding effect against radiation emanating from the mobile telephone. However, other electrically conductive shielding materials may be used for the conducting layer 37. The conducting layer 37 may extend over the whole of the casing or may only extend over that part of the casing where the greatest levels of radiation emanate from the mobile telephone. The window 33 may comprise a laminate, and one layer of the laminate may comprise a transparent electrically conductive material that forms part of the screen or shielding arrangement provided by the casing. The transparent electrically conducting material may comprise silver oxide or tin oxide.

The shield 20 is secured to the sidewall 31 of the casing. The shield 20 may be secured to the casing of the telephone in any appropriate way, for example, by rivetting or, if the base plate 1 is provided with peripheral apertures, by stitching. It is preferred that the base plate 1, which is made of electrically conducting material, is in electrical contact with the electrically conducting layer 37 to provide an integral shield for radiation.

It is to be appreciated that when a mobile telephone has been inserted in the case illustrated in FIG. 3, the shield will operate in the same way as the shield of FIG. 2 which was actually secured to the housing of the telephone. Thus, when the slider element 2 is in the upper position the conductive portion 3 will be adjacent the aerial or antenna, to one side of the telephone, with the resilient finger 4 in contact with the aerial or antenna.

FIG. 4 illustrates the rear of a mobile telephone 40 having a housing 41 and an antenna 42. A shield of the type illustrated in FIG. 1 may, as has been described with reference to FIG. 2, be mounted on the side wall 43 of the telephone in the position illustrated by the dotted region 44. Thus the shield is located immediately adjacent the antenna 42, the antenna 42 being provided adjacent one side of the telephone.

An alternative position for the shield that can provide some effects is illustrated by the dotted line 45, this region being in alignment with the aerial or antenna, but on the rear face of the telephone, that is to say the face of the telephone that normally faces away from the head of the user when the telephone is in use. It is believed that the presence of the shield here disrupts the pattern of radiation emanated by the aerial to such an extent that only a relatively low proportion of the radiation emanated by the device actually impinges on the head of the person using the device. With the slider element 2 in its upper position, the resilient finger 4 may contact the antenna.

A further alternative position for the shield is illustrated by the dotted line 47, which indicates an area on the side 46 of the telephone which is remote from the aerial 42. Again it has been found that a shield placed in this location can provide a beneficial effect, even though the resilient finger 4 may be omitted in this embodiment.

FIG. 5 illustrates a mobile telephone 50 which has a shield corresponding to the shield 20 formed integrally within the casing of the telephone. Thus, in the illustrated embodiment, the telephone 50 has a housing 51 which defines a front face 52 provided with a display screen and key-pad etc., and the telephone has an antenna 53 which is located adjacent one side 54 of the casing. Formed within the side 54 of the casing is an elongate aperture 55 in which is located a sliding button 56. The sliding button 56 is connected to a shield element which has, when in the operative position, a protruding electrically conductive portion 57 which carries a rearwardly deflected resilient electrically conducting finger 58. The conducting portion 57 and the finger 58 may be made of any appropriate electrically conductive material, such as a metal. The slider 56 is shown almost at the lower end of the slot 55, and consequently the conductive element 57 is almost fully retracted within the housing 51 of the telephone. However, it is to be appreciated that as the slider button 56 is moved further up the aperture 55, a greater extent of the conductive element 57 will become exposed at the top of the telephone, until the conductive element 57 has a protruding length which is substantially equal to the protruding length of the antenna 53.

Part of the slider mechanism within the housing 51 will comprise a metal plate or other electrically conductive element that is located adjacent the power block to provide a shielding effect. The slider mechanism may also be in electrical contact with an electrically conductive shield formed integrally with the housing which extends over all or part of the housing.

Whilst the invention has been described with specific reference to a mobile telephone, it is to be appreciated that the invention is applicable to other types of communication device such as paging devices, especially active paging devices.

In the embodiments described above, the conductive element 3 may be moved slidably to any selected position. The greatest shielding effect is obtained if the element 3 is moved to the fully extended position. However, if the shielding is then too great, prohibiting the antenna from receiving an adequate signal from the transmitter/receiver of the relevant cell, the conductive element may be partially or fully retracted, so that an appropriate degree of shielding is provided. Whilst in the described embodiments the conductive element carries a resilient conductive finger which touches the antenna, the conductive element itself may be so stopped, or may have such resilient properties, that when the shield is in the operative position, the conductive element itself touches the antenna.

What is claimed is:

1. A shield for shielding radiation from a communication device, having an antenna, the shield comprising a main portion and an electrically conductive portion adapted to be located at a position spaced from the antenna, the shield being movable relative to the antenna between a retracted position and an extended position, the electrically conductive portion carrying a resilient electrically conductive finger, the resilient finger being adapted to extend laterally from the main portion of the shield to the antenna to touch the antenna of the communication device.

2. A shield for shielding radiation from a communication device, the shield comprising a base plate made of conductive material, a slider, and a cover, the slider being located between the base plate and the cover, part of the slider being accessible through the cover, to effect sliding of the slider, the slider being movable between a retracted position and an extended position, the slider, when in the extended position, having an electrically conductive portion extending beyond the base plate and the cover.

3. A shield according to claim 2 wherein the electrically conductive portion of the slider carries a resilient laterally extending conductive finger adapted to touch an antenna of the communication device.

4. A shield according to claim 2 wherein the electrically conductive portion, when in the extended position, is located to one side of an antenna of the communication device, the electrically conductive portion being not located between the antenna and a person using the communication device.

5. A communication device having an antenna, and a shielding element movable relative to the antenna from a retracted position to an extended position, the shielding element having a resilient electrically conductive portion which, when the shielding element is in the extended position, extends laterally from the shielding element to touch the antenna.

6. A shielding device for use with a communication device, the shielding device comprising an electrically conductive element; supporting means slidably supporting the conductive element; means for mounting the supporting means in position relative to the communication device; and means for sliding the electrically conductive element from a retracted position to an extended position, the electrically conductive element, when in the extended position, having a predetermined position relative to the antenna of the communication device, wherein the shielding device is movable to an extended position, the entire shielding device being located to and being extended from one side of an antenna of the communication device so that, in use, the entire shielding device is not located between the antenna of the communication device and a person using the communication device.

7. A shield for shielding radiation from a communication device having an antenna, the shield comprising a main electrically conductive portion adapted to extend from a side portion of the communication device, the entire shield being located not between the antenna and a user of the communication device, the electrically conductive portion being located at a position spaced from the antenna, the shield being slidable so that a protruding length of the shield may be adjusted.

8. A shielding device for use with a communication device having an antenna, the shielding device comprising an electrically conductive element; supporting means slidably supporting the conductive element; means for mounting the supporting means in position relative to the communication device; means for sliding the electrically conductive element from a retracted position to an extended position; and an electrically conductive portion adapted to extend laterally from the electrically conductive element to touch the antenna, the electrically conductive element, when in the extended position, having a predetermined position relative to the antenna of the communication device, wherein the shielding device is movable to the extended position.

9. A casing for a communication device, the casing receiving a communication device, having an antenna, the casing being provided with a retractable conductive shield, the shield being movable relative to the antenna from a retracted position to an extended position wherein a conductive portion of the shield is adapted to extend laterally from a main portion of the shield and to touch the antenna, the casing being made of a laminate incorporating an intermediate conducting layer, the shield being in electrical contact with said conducting layer.

* * * * *